US011349548B2

(12) United States Patent
Mohandoss et al.

(10) Patent No.: US 11,349,548 B2
(45) Date of Patent: May 31, 2022

(54) METHOD FOR DETECTING BEAM FAILURE EVENT BY BASE STATION IN WIRELESS NETWORK

(71) Applicants: Centre of Excellence in Wireless Technology, Chennai (IN); Indian Institute of Technology Madras (IIT Madras), Chennai (IN)

(72) Inventors: Chandrasekaran Mohandoss, Chennai (IN); Thirunageswaram Ramachandran Ramya, Chennai (IN); Jeniston Deviraj Klutto Milleth, Chennai (IN); Bhaskar Ramamurthi, Chennai (IN)

(73) Assignees: Center of Excellence in Wireless Technology, Chennai (IN); Indian Institute of Technology Madras, Chennai (IN)

( * ) Notice: Subject to any disclaimer, the term of this patent is extended or adjusted under 35 U.S.C. 154(b) by 97 days.

(21) Appl. No.: 16/887,801

(22) Filed: May 29, 2020

(65) Prior Publication Data

US 2020/0382196 A1 Dec. 3, 2020

(30) Foreign Application Priority Data

May 31, 2019 (IN) .............................. 201941021788

(51) Int. Cl.
| | | |
|---|---|---|
| *H04B 7/06* | (2006.01) | |
| *H04B 7/08* | (2006.01) | |
| *H04W 16/28* | (2009.01) | |
| *H04L 5/00* | (2006.01) | |
| *H04B 17/336* | (2015.01) | |
| *H04B 17/318* | (2015.01) | |
| *H04W 24/10* | (2009.01) | |

(52) U.S. Cl.
CPC ......... *H04B 7/0695* (2013.01); *H04B 7/0617* (2013.01); *H04B 7/0632* (2013.01); *H04B 7/088* (2013.01); *H04B 17/318* (2015.01); *H04B 17/336* (2015.01); *H04L 5/0051* (2013.01); *H04W 16/28* (2013.01); *H04W 24/10* (2013.01)

(58) Field of Classification Search
CPC ..... H04B 7/0617; H04B 7/0695; H04B 7/088
See application file for complete search history.

(56) References Cited

U.S. PATENT DOCUMENTS

| | | | | |
|---|---|---|---|---|
| 10,979,127 B2* | 4/2021 | Zhang | .................. | H04W 80/02 |
| 11,082,286 B2* | 8/2021 | Pan | .................. | H04W 72/0413 |
| 2018/0110066 A1* | 4/2018 | Luo | .................. | H04W 72/0413 |
| 2018/0375556 A1* | 12/2018 | Wang | .................. | H04B 7/061 |
| 2019/0053288 A1* | 2/2019 | Zhou | .................. | H04W 74/006 |
| 2019/0053314 A1* | 2/2019 | Zhou | .................. | H04B 7/0695 |

(Continued)

*Primary Examiner* — Fahmida S Chowdhury

(57) ABSTRACT

Accordingly, the embodiment provides a method for detecting a beam failure event by a Base Station (BS) (100) in a wireless network (1000). The method includes transmitting at least one of a resource scheduling configuration and a reference signal configuration to at least one first User Equipment (UE) (300a) in the wireless network (1000). Further, the method includes determining whether at least one response is received from the first UE (300a). Further, the method includes detecting a beam failure event associated with at least one beam from the plurality of beams of the first UE (300a) in response to determining that the at least one response is not received from the first UE (300a).

30 Claims, 12 Drawing Sheets

(56) References Cited

U.S. PATENT DOCUMENTS

| | | | |
|---|---|---|---|
| 2019/0058629 A1* | 2/2019 | Akoum | H04L 5/0048 |
| 2019/0075014 A1* | 3/2019 | Zhou | H04W 72/042 |
| 2019/0075524 A1* | 3/2019 | Zhou | H04W 52/228 |
| 2019/0245737 A1* | 8/2019 | Zhou | H04B 7/06 |
| 2019/0306875 A1* | 10/2019 | Zhou | H04W 72/1284 |
| 2019/0320469 A1* | 10/2019 | Huang | H04W 72/14 |
| 2021/0076442 A1* | 3/2021 | Matsumura | H04B 7/088 |

* cited by examiner

METHOD FOR DETECTING BEAM FAILURE EVENT BY BASE STATION IN WIRELESS NETWORK

FIELD OF INVENTION

The present invention disclosure relates to wireless communication, and more specifically related to a method for detecting a beam failure event by a Base Station (BS) in a wireless network. The present application is based on, and claims priority from an Indian Provisional Application Number 201941021788 dated 31 May 2019 the disclosure of which is hereby incorporated by reference herein.

BACKGROUND OF INVENTION

Radio spectrum is a very scarce resource due to the limited availability for cellular communications and demand for very high data rate applications, which is growing exponentially. To meet a fifth-generation (5G) and beyond data rate requirements, the latest technologies are exploring the options for cellular operation in millimeter wave (mm-Wave) band. Attenuation is very high in the mmWave band compared to lower frequency bands. However, antenna size decreases with frequency, leading to much smaller size antennas in the mmWave band. This enables packing of a large number of antennas in a given space, leading to a massive multiple-input multiple-output (MIMO) system.

With the large number of antennas at a base station (BS) and user equipment (UE), highly directive transmission and reception can be achieved using electronically steerable beams, the technique is known as beamforming. Transmit beamforming can be achieved by precoding a signal to be transmitted to direct the transmitted energy towards a user of interest using the multiple transmit antennas, helps in reducing interference to other UEs. Receive beamforming can be achieved by appropriately combining the signals received using the multiple receive antennas. It also filters-out interference from undesired BS or the UE. In a nutshell, beamforming is a key technique to compensate for an additional path loss in the mmWave band and is considered as an enabling technology for 5G cellular communications. The BS can include one or more transmission-reception points (TRP) to avoid coverage holes. Forming multiple narrow beams enables serving more UEs in the same time-frequency grid, thus increasing the spectral efficiency.

Further, each narrow beam can be treated as a virtual cell and each user can be assigned with multiple narrow beams. Therefore, the BS must manage the multiple narrow beams and multiple UEs simultaneously, hence a new procedure is needed and is called beam management. Beam management is an essential part of the 5G systems. A suitable beam pair between the BS and the UE should be established both in an uplink (UL) and a downlink (DL). Since the beams are narrow, movements in transmitter or receiver or presence of a blockage will make the beam pair unsuitable, leads to a beam failure. The beam failure necessitates a beam handover. However, there will be a loss in data and some excess delay during the beam reestablishment period.

The beam failure is more critical in the case of integrated access and backhaul (IAB) nodes. An IAB node acts as a UE to its parent node and as BS to its access UEs and child IAB nodes. The link between the IAB node and its parent node is known as back-haul link. The link between the IAB node and its child nodes is known as access link. Beam failure in the wireless back-haul link is critical and affects a greater number of access UEs and child IAB nodes.

Prior detection of the beam failure using proactive measures helps to overcome the detrimental effects of beam failure. Beam failure detection can be done at the BS or UE. Once the BS/UE gets an indication of possible beam failure, corrective measures can be incorporated to avoid a possible communication loss.

Thus, it is desired to address the above-mentioned disadvantages or other shortcomings or at least provide a useful alternative.

OBJECT OF INVENTION

The principal object of the embodiments herein is to a method for detecting a beam failure event by a Base Station (BS) in a wireless network.

Another object of the embodiments is to detect a beam failure event associated with at least one beam from the plurality of beams of a first User Equipment (UE) in response to determining that at least one response is not received from the first UE.

Another object of the embodiments is to detect that at least one response for the reference signal configuration is not received from the first UE in response to determining that an auto-correlation does not meet a correlation threshold.

Another object of the embodiments is to determine whether at least one property common between the first UE for which the beam failure event is detected and at least one second UE in the wireless network and predict a beam failure event associated with at least one beam from a plurality of beams of the at least one second UE in response to determining the at least one property common between the first UE for which the beam failure event is detected and the at least one second UE.

Another object of the embodiments is to determine at least one second UE in proximity to the first UE for which the beam failure event is detected in the wireless network and predict a beam failure event associated with at least one beam from a plurality of beams of the at least one second UE in proximity to the first UE.

Another object of the embodiments is to determine a number of the beam failure events detected with the first UE meets a beam recovery threshold and automatically initiate a beam recovery procedure in response to determining that the number of the beam failure events detected with the first UE meets the beam recovery threshold.

Another object of the embodiments is to detect a beam failure event associated with the first UE in response to determining that the at least one of a Received Signal Strength Indicator (RSSI), a Reference Signal Receive Power (RSRP), a Reference Signal Receive Quality (RSRQ), a signal-to-interference-plus-noise ratio (SINR) and a channel quality indicator (CQI) does not meet at least one signal quality threshold.

BRIEF SUMMARY OF THE INVENTION

Accordingly, the embodiment provides a method for detecting a beam failure event by a Base Station (BS) in a wireless network. The method includes transmitting, by the BS, at least one of a resource scheduling configuration and a reference signal configuration to at least one first User Equipment (UE) in the wireless network. Further, the method includes determining, by the BS, whether at least one response is received from the first UE, wherein the at least one response comprises at least one of a Uplink (UL) data sent by the first UE based on the resource scheduling configuration, a feedback for Downlink (DL) data received from the first UE based on the resource scheduling configuration, and at least one reference signal transmission from the first UE based on the reference signal configuration. Further, the method includes detecting, by the BS, a beam failure event associated with at least one beam from the plurality of beams of the first UE in response to determining that the at least one response is not received from the first UE.

In an embodiment, the resource scheduling configuration comprises at least one of scheduling information of at least one resource in the UL for the first UE to transmit data to the BS and scheduling information of at least one resource in the DL for the first UE to receive data from the BS.

In an embodiment, the reference signal configuration comprises information of at least one resource in an UL for first UE to transmit the at least one reference signal to the BS.

In an embodiment, determining whether at least one response for the reference signal configuration is received from the first UE includes estimating a channel using the at least one reference signal, determining an auto-correlation of the estimated channel from at least one of the different time resources and different frequency resources, determining whether the auto-correlation meets a correlation threshold, and detecting that the at least one response for the reference signal configuration is not received from the first UE in response to determining that the auto-correlation does not meet the correlation threshold.

In an embodiment, the method includes determining, by the BS, whether at least one property common between the first UE for which the beam failure event is detected and at least one second UE in the wireless network. Further, the method includes predicting, by the BS, a beam failure event associated with at least one beam from a plurality of beams of the at least one second UE in response to determining the at least one property common between the first UE for which the beam failure event is detected and the at least one second UE.

In an embodiment, the at least one property common comprises at least one of a number of common beam sets, an Angle of Arrival (AoA) meeting a AoA tolerance, a Timing Advancement (TA) value meeting a TA tolerance, a pattern of measurements, and a pattern of beam failure events.

In an embodiment, the method includes determining, by the BS, at least one second UE in proximity to the first UE for which the beam failure event is detected in the wireless network. Further, the method includes predicting, by the BS, a beam failure event associated with at least one beam from a plurality of beams of the at least one second UE in proximity to the first UE.

In an embodiment, the method includes determining, by the BS, a number of the beam failure events detected with the first UE meets a beam recovery threshold. Further, the method includes automatically initiating, by the BS, a beam recovery procedure in response to determining that the number of the beam failure events detected with the first UE meets the beam recovery threshold.

In an embodiment, the beam recovery procedure includes receiving at least one reference signal from the first UE by using at least one of a plurality of transmission-reception points (TRP) and a plurality of receive beams within a symbol time, determining at least one optimal TRP from the plurality of TRPs and at least one optimal receive beam from the plurality of receive beams based on a signal quality of the at least one reference signal, and adding the at least one optimal TRP to at least one active TRP associated with the first UE and the at least one optimal beam to at least one active beam associated with the first UE.

In an embodiment, the at least one optimal beam is added to the at least one active receive beam in UL for the BS to receive a signal from the first UE, and the at least one optimal beam is added to the at least one active transmit beam in DL for the BS to transmit a signal to the first UE.

Accordingly, the embodiment provides a method for detecting a beam failure event by a Base Station (BS). The method includes receiving, by the BS, at least one measurement information from at least one User Equipment (UE) or measuring, by the BS, at least one measurement information of the at least one UE, wherein the measurement information comprises at least one of a received signal strength indicator (RSSI), a reference signal received power (RSRP), a reference signal received quality (RSRQ), a signal-to-interference-plus-noise ratio (SINR) and a channel quality indicator (CQI). Further, the method includes determining, by the BS, whether the at least one of the RSSI, the RSRP, the RSRQ, the SINR, and the CQI meets at least one signal quality threshold. Further, the method includes detecting, by the BS, a beam failure event associated with the first UE in response to determining that the at least one of the RSSI, the RSRP, the RSRQ, the SINR, and the CQI does not meet the at least one signal quality threshold.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

DESCRIPTION OF THE DRAWINGS

This invention is illustrated in the accompanying drawings, throughout which like reference letters indicate corresponding parts in the various figures. The embodiments herein will be better understood from the following description with reference to the drawings, in which.

DETAILED DESCRIPTION OF INVENTION

Figure 1:
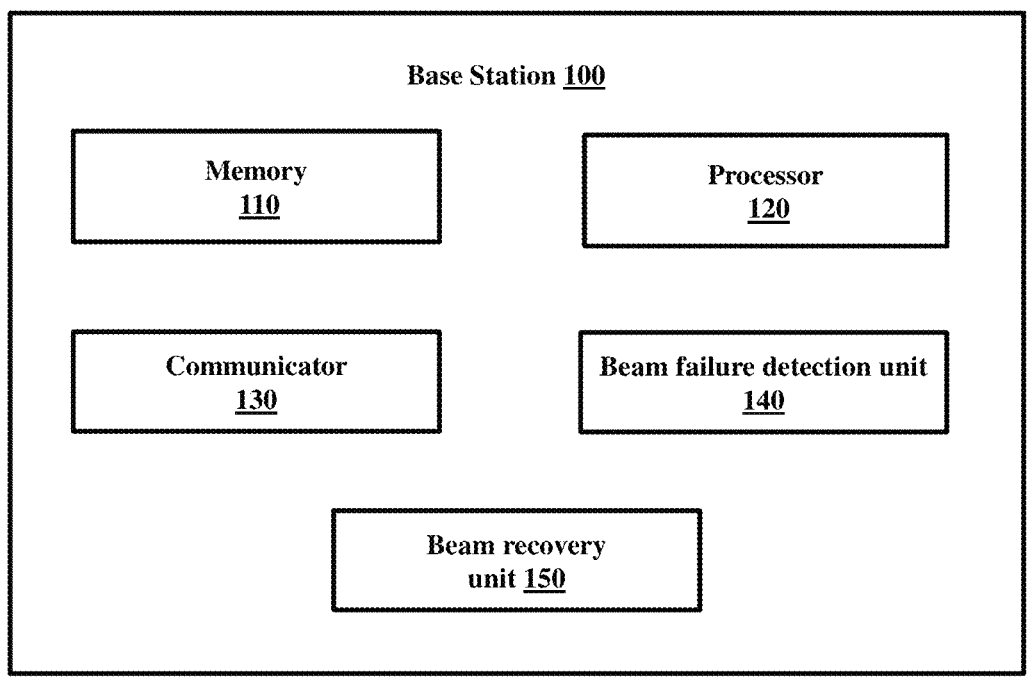
FIG. 1 illustrates a block diagram of a base station (BS) for detecting a beam failure event in a wireless network, according to an embodiment as disclosed herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as units or modules or the like, are physically implemented by analog or digital circuits such as logic gates, integrated circuits, microprocessors, microcontrollers, memory circuits, passive electronic components, active electronic components, optical components, hardwired circuits, or the like, and may optionally be driven by firmware and software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the invention. Likewise, the blocks of the embodiments may be physically combined into more complex blocks without departing from the scope of the invention The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings. Although the terms first, second, etc. may be used herein to describe various elements, these elements should not be limited by these terms. These terms are generally only used to distinguish one element from another.

Beamforming is a signal processing technique used for directional signal transmission or reception. Beamforming can be used at both transmitting and receiving sides to achieve spatial selectivity; hence Beamforming is also known as spatial filtering. In a typical beamforming configuration, a transmitter with an antenna array multiplies the signal by different "weights" at the respective antennas, and thus the signal experiences constructive interference at desired directions or sectors and destructive interference at other directions or sectors. As a result, it can have a desired antenna pattern where a main lobe, serving as a beam for transmitting the signal to a receiver, is produced together with nulls and side lobes. By adjusting the main lobe width and the side lobes levels, the position of a null can be controlled.

Beamforming is an integral part of mmWave communication, to address its lossy propagation characteristics. In the presence of narrow beams, it is necessary to establish and retain a suitable beam pair, that is a transmitter-side beam direction and a corresponding receiver-side beam direction that jointly provide good connectivity. Base Station (BS) needs to cover the entire coverage area using one or more number of transmission-reception points (TRP) and one or more number of beams for every TRPs. Hence, the BS consists of one or more TRPs located at different positions to ensure the coverage. The BS should identify a smaller set of transmitting or receiving beams from its total set of transmitting or receiving beams as active transmit or receive beams for each UE. Active BS transmit/receive beam sets are formed using the transmit/receive beams associated with one or more TRPs.

Similarly, the UE also should identify a smaller set of receiving or transmitting beams from its total set of receiving or transmitting beams as active receive and transmit beams for the BS. A combination of the BS transmit beam and UE receive beam form a downlink beam pair and, a combination of UE transmit beam and BS receive beam form an uplink beam pair. The beam pairs for downlink and uplink will be the same if beam correspondence or reciprocity is applicable. Beam correspondence/reciprocity is valid in time division duplexing (TDD) communications or in frequency division duplexing (FDD) with a line of sight (LOS) path available between a transmitter and a receiver. Multiple active beam pairs for each UE is essential at the BS so that it can switch to another beam pair dynamically if the said beam pair gets weaker. In a practical wireless system, the BS must maintain multiple connected UEs and multiple active beams simultaneously. This can be achieved by a process, which is widely known as beam management.

In general, beam management is divided into different parts:
  I. Initial beam acquisition, establishing an initial beam pair;
  II. Fine beam acquisition/beam tracking, primarily to compensate for movements, rotations of the mobile device, and for gradual changes in the environment; and
  III. Beam recovery to handle the situation when rapid changes in the environment disrupt the current beam pair.

In some cases, movements in the environment or other events may lead to a currently established beam pair being rapidly blocked without enough time for the regular beam tracking to adapt. This kind of beam failure events can happen more frequently especially in the wireless system working with very narrow beams. After the occurrence of many beam failure events within a short span of time, BS and UE acknowledge the beam failure and the beam recovery procedure can be initiated. This procedure is considered a reactive mechanism and it can create a significant negative impact on the performance compared to a proactive mechanism. The objective of the proactive beam failure detection and correction mechanisms is to avoid beam failure events, thereby increasing the performance of the wireless system.

Accordingly, embodiments herein disclose a method for detecting a beam failure event by a Base Station (BS) in a wireless network. The method includes transmitting, by the BS, at least one of a resource scheduling configuration and a reference signal configuration to at least one first User Equipment (UE) in the wireless network. Further, the method includes determining, by the BS, whether at least one response is received from the first UE, wherein the at least one response comprises at least one of a Uplink (UL) data sent by the first UE based on the resource scheduling configuration, a feedback for Downlink (DL) data received from the first UE based on the resource scheduling configuration, and at least one reference signal transmission from the first UE based on the reference signal configuration. Further, the method includes detecting, by the BS, a beam failure event associated with at least one beam from the plurality of beams of the first UE in response to determining that the at least one response is not received from the first UE.

In an example, the reference signal configuration may be a sounding reference signal (SRS) configuration or a demodulation reference signal (DMRS) configuration. The SRS is an UL reference signal which is transmitted by the UE to the BS. Hence, the UE transmits the DMRS along with the data channel or the control channel based on the DMRS configuration. The BS can estimate the channel quality using the SRS and manages further resource scheduling, beam management, link adaptation and power control. DMRS is always associated with the data channel or the control channel. Hence, the BS can estimate the radio channel using this DMRS and can use it for the demodulation of the data channel or the control channel.

Referring now to the drawings, and more particularly to FIGS. 1 through 7e, where similar reference characters denote corresponding features consistently throughout the figures, there are shown preferred embodiments.

FIG. 1 illustrates a block diagram of a base station (BS) (100) for detecting a beam failure event in a wireless network (1000), according to an embodiment as disclosed herein. In an embodiment, the BS (100) includes a memory (110), a processor (120), a communicator (130), a beam failure detection unit (140), and a beam recovery unit (150).

The memory (110) also stores instructions to be executed by the processor (120). The memory (110) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (110) may, in some examples, be considered a non-transitory storage medium. The term "non-transitory" may indicate that the storage medium is not embodied in a carrier wave or a propagated signal. However, the term "non-transitory" should not be interpreted that the memory (110) is non-movable. In some examples, the memory (110) can be configured to store larger amounts of information than the memory. In certain examples, a non-transitory storage medium may store data that can, over time, change (e.g., in Random Access Memory (RAM) or cache). In an embodiment, the memory (110) can be an internal storage unit or it can be an external storage unit of the electronic device 100, a cloud storage, or any other type of external storage.

The processor (120) communicates with the memory (110), the communicator (130), the beam failure detection unit (140), and the beam recovery unit (150). The processor (120) is configured to execute instructions stored in the memory (110) and to perform various processes. The communicator (130) is configured for communicating internally between internal hardware components and with external devices via one or more networks.

In an embodiment, the beam failure detection unit (140) is configured to transmit at least one of a resource scheduling configuration and a reference signal configuration to at least one first User Equipment (UE) (300a) in the wireless network (1000). The resource scheduling configuration comprises at least one of scheduling information of at least one resource in an Uplink (UL) for the first UE (300a) to transmit data to the BS (100), and scheduling information of at least one resource in a Downlink (DL) for the first UE (300a) to receive data from the BS (100). The reference signal configuration comprises information of at least one resource in the UL for the first UE (300a) to transmit at least one reference signal to the BS (100). The at least one response, for the reference signal configuration, comprises the at least one reference signal transmission on the at least one resource allocated in the UL.

Further, the beam failure detection unit (140) is configured to determine whether at least one response is received from the first UE (300a). The at least one response for the resource scheduling configuration comprises at least one of UL data sent by the first UE (300a) based on the resource scheduling configuration (in the UL), and a feedback for DL data received from the first UE (300a) based on the resource scheduling configuration (in the DL), and at least one reference signal transmission from the first UE (300a) based on the reference signal configuration. Further, the beam failure detection unit (140) is configured to detect a beam failure event associated with at least one beam from the plurality of beams of the first UE (300a) in response to determining that the at least one response is not received from the first UE (300a).

Further, the beam failure detection unit (140) is configured to estimate a channel using the at least one reference signal. Further, the beam failure detection unit (140) is configured to determine an auto-correlation of the estimated channel from at least one of the different time resources and different frequency resources. Further, the beam failure detection unit (140) is configured to determine whether the auto-correlation meets a correlation threshold. Further, the beam failure detection unit (140) is configured to detect that the at least one response for the reference signal configuration is not received from the first UE (300a) in response to determining that the auto-correlation does not meet the correlation threshold.

Further, the beam failure detection unit (140) is configured to determine whether at least one property common between the first UE (300a) for which the beam failure event is detected and at least one second UE (300b) in the wireless network (1000). Further, the beam failure detection unit (140) is configured to predict a beam failure event associated with at least one beam from a plurality of beams of the at least one second UE (300b) in response to determining the at least one property common between the first UE (300a) for which the beam failure event is detected and the at least one second UE (300b). The at least one property common comprises at least one of a number of common beam sets, an Angle of Arrival (AoA) meeting a AoA tolerance, a Timing Advancement (TA) value meeting a TA tolerance, a pattern of measurements and a pattern of beam failure events.

Further, the beam failure detection unit (140) is configured to determine at least one second UE (300b) in proximity to the first UE (300a) for which the beam failure event is detected in the wireless network (1000). Further, the beam failure detection unit (140) is configured to predict a beam failure event associated with at least one beam from a plurality of beams of the at least one second UE (300b) in proximity to the first UE (300a).

Further, the beam failure detection unit (140) is configured to receive at least one measurement information from the at least one UE (300) or measuring at least one measurement information of the at least one UE (300), the measurement information comprises at least one of a received signal strength indicator (RSSI), a reference signal received power (RSRP), a reference signal received quality (RSRQ), a signal-to-interference-plus-noise ratio (SINR) and a channel quality indicator (CQI). Further, the beam failure detection unit (140) is configured to determine whether the at least one of the RSSI, the RSRP, the RSRQ, the SINR, and the CQI meets at least one signal quality threshold. Further, the beam failure detection unit (140) is configured to detect a beam failure event associated with the first UE (300a) in response to determining that the at least one of the RSSI, the RSRP, the RSRQ, the SINR and the CQI does not meet the at least one signal quality threshold.

In an embodiment, the beam recovery unit (150) is configured to determine a number of the beam failure events detected with the first UE (300a) meets a beam recovery threshold. Further, the beam recovery unit (150) is configured to automatically initiate a beam recovery procedure in response to determining that the number of the beam failure events detected with the first UE (300a) meets the beam recovery threshold. Further, the beam recovery unit (150) is configured to receive at least one reference signal from the first UE (300a) by using at least one of a plurality of transmission-reception points (TRP) and a plurality of receive beams within a symbol time. Further, the beam recovery unit (150) is configured to determine at least one optimal TRP from the plurality of TRPs and at least one optimal receive beam from the plurality of receive beams based on a signal quality of the at least one reference signal. Further, the beam recovery unit (150) is configured to add the at least one optimal TRP to at least one active TRP associated with the first UE (300a) and the at least one optimal beam to at least one active beam associated with the first UE (300a). The at least one optimal beam is added to the at least one active receive beam in UL for the BS (100) to receive a signal from the first UE (300a), and the at least one optimal beam is added to the at least one active transmit beam in DL for the BS (100) to transmit a signal to the first UE (300a).

Although the FIG. 1 shows various hardware components of the BS (100) but it is to be understood that other embodiments are not limited thereon. In other embodiments, the BS (100) may include less or more number of components. Further, the labels or names of the components are used only for illustrative purpose and does not limit the scope of the invention. One or more components can be combined together to perform same or substantially similar function to detect the beam failure event.

FIG. 2a-2f is a flow diagram (200) illustrating a method for detecting a beam failure event by the BS (100) in the wireless network (1000), according to an embodiment as disclosed herein. The operations (202-222) are performed by the BS (100).

Figure 2A:
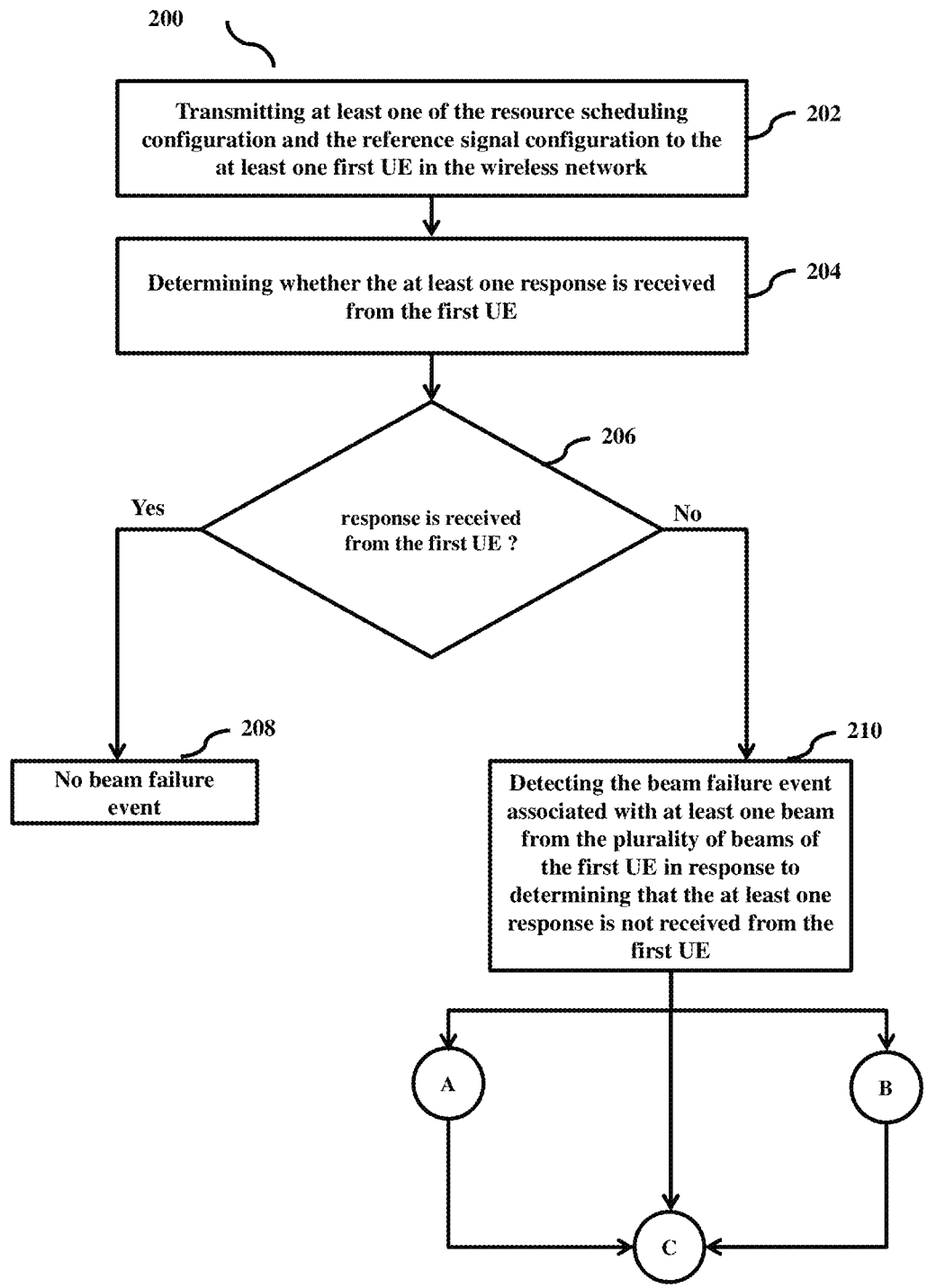
FIG. 2a-2f is a flow diagram illustrating a method for detecting the beam failure event by the BS in the wireless network, according to an embodiment as disclosed herein.

Referring to the FIG. 2a: at 202, the method includes transmitting the at least one of a resource scheduling configuration and the reference signal configuration to the at least one first UE (300a) in the wireless network (1000). At 204-206, the method includes determining whether at least one response is received from the first UE (300a), where the at least one response comprises the at least one of UL data sent by the first UE (300a) based on the resource scheduling configuration, the feedback for DL data received from the first UE (300a) based on the resource scheduling configuration, and at least one reference signal transmission from the first UE (300a) based on the reference signal configuration. At 208, the method includes detecting no beam failure event in response to determining that the at least one response is received from the first UE (300a). At 210, the method includes detecting the beam failure event associated with at least one beam from the plurality of beams of the first UE (300a) in response to determining that the at least one response is not received from the first UE (300a).

Figure 2B:
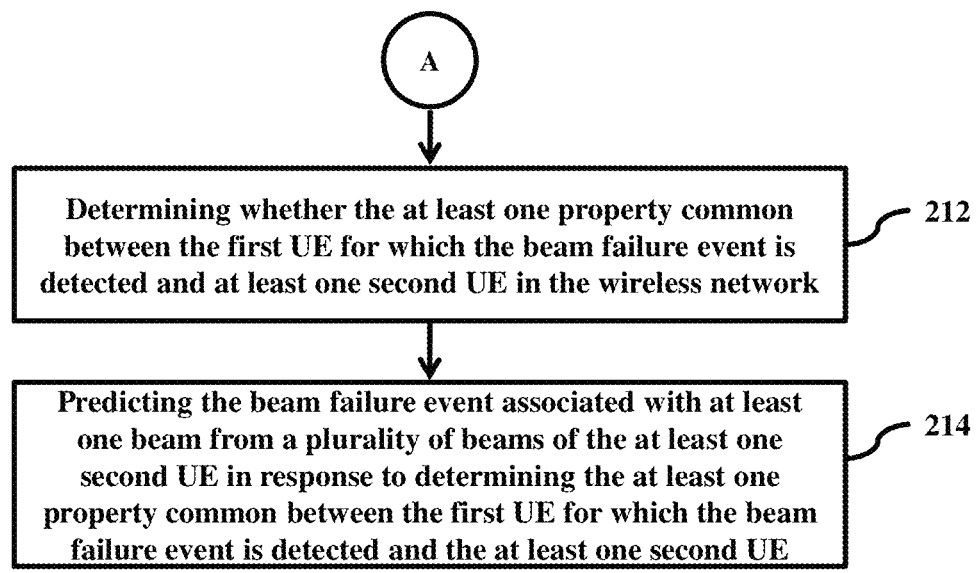

Referring to the FIG. 2b: at 212, the method includes determining whether the at least one property common between the first UE (300a) for which the beam failure event is detected and at least one second UE (300b) in the wireless network (100). At 214, the method includes predicting a beam failure event associated with at least one beam from the plurality of beams of the at least one second UE (300b) in response to determining the at least one property common between the first UE (300a) for which the beam failure event is detected and the at least one second UE (300b).

Figure 2C:
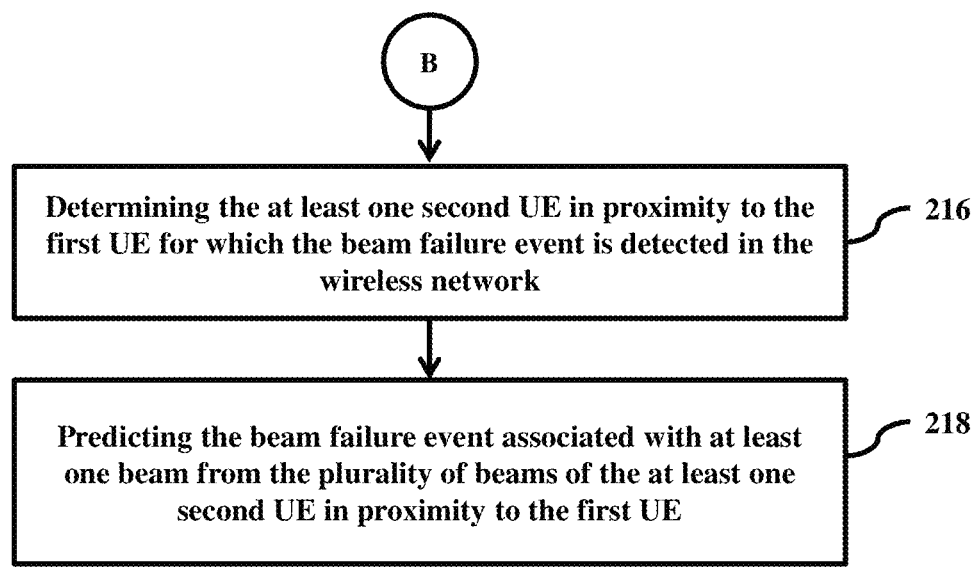

Referring to the FIG. 2c: at 216, the method includes determining the at least one second UE (300b) in proximity to the first UE (300a) for which the beam failure event is detected in the wireless network (1000). At 218, the method includes predicting the beam failure event associated with at least one beam from the plurality of beams of the at least one second UE (300b) in proximity to the first UE (300a).

Figure 2D:
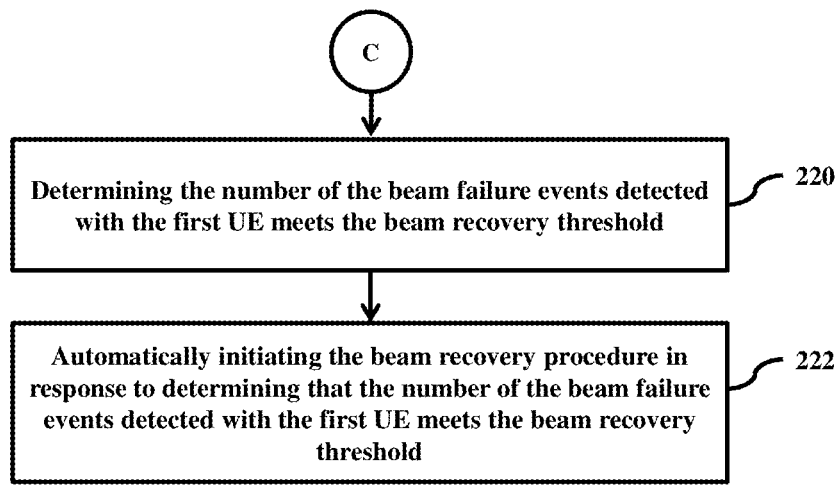

Referring to the FIG. 2d: at 220, the method includes determining the number of the beam failure events detected with the first UE (300a) meets the beam recovery threshold. At 222, the method includes automatically initiating the beam recovery procedure in response to determining that the number of the beam failure events detected with the first UE (300a) meets the beam recovery threshold.

Figure 2E:
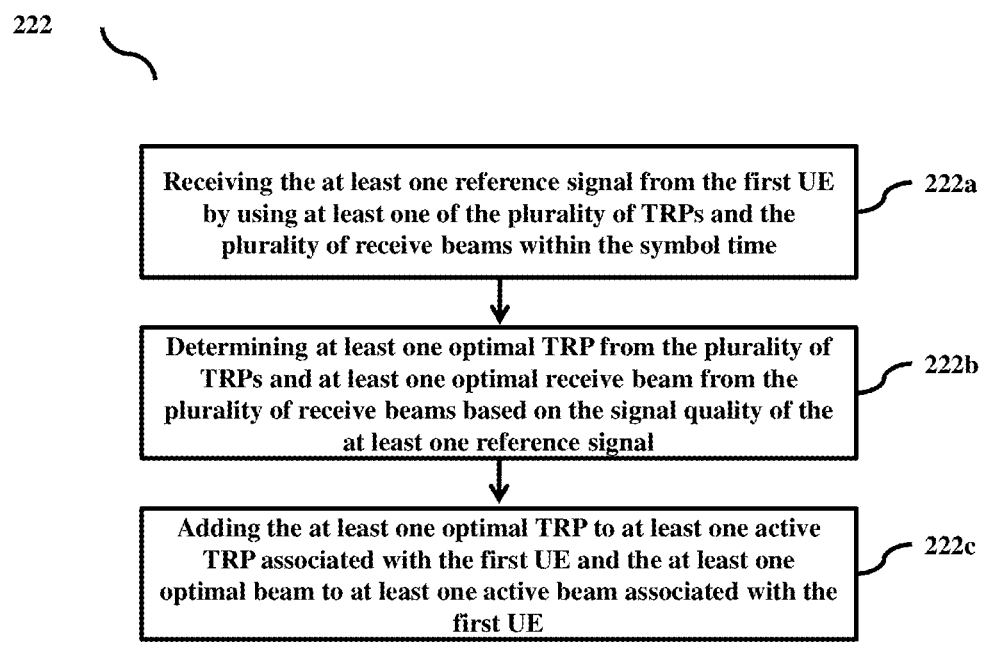

Referring to the FIG. 2e: at 222a, the method includes receiving the at least one reference signal from the first UE (300a) by using at least one of a plurality of TRPs and a plurality of receive beams within the symbol time. At 222b, the method includes determining the at least one optimal TRP from the plurality of TRPs and at least one optimal receive beam from the plurality of receive beams based on the signal quality of the at least one reference signal. At 222c, the method includes adding the at least one optimal TRP to at least one active TRP associated with the first UE (300a) and the at least one optimal beam to at least one active beam associated with the first UE (300a).

Figure 2F:
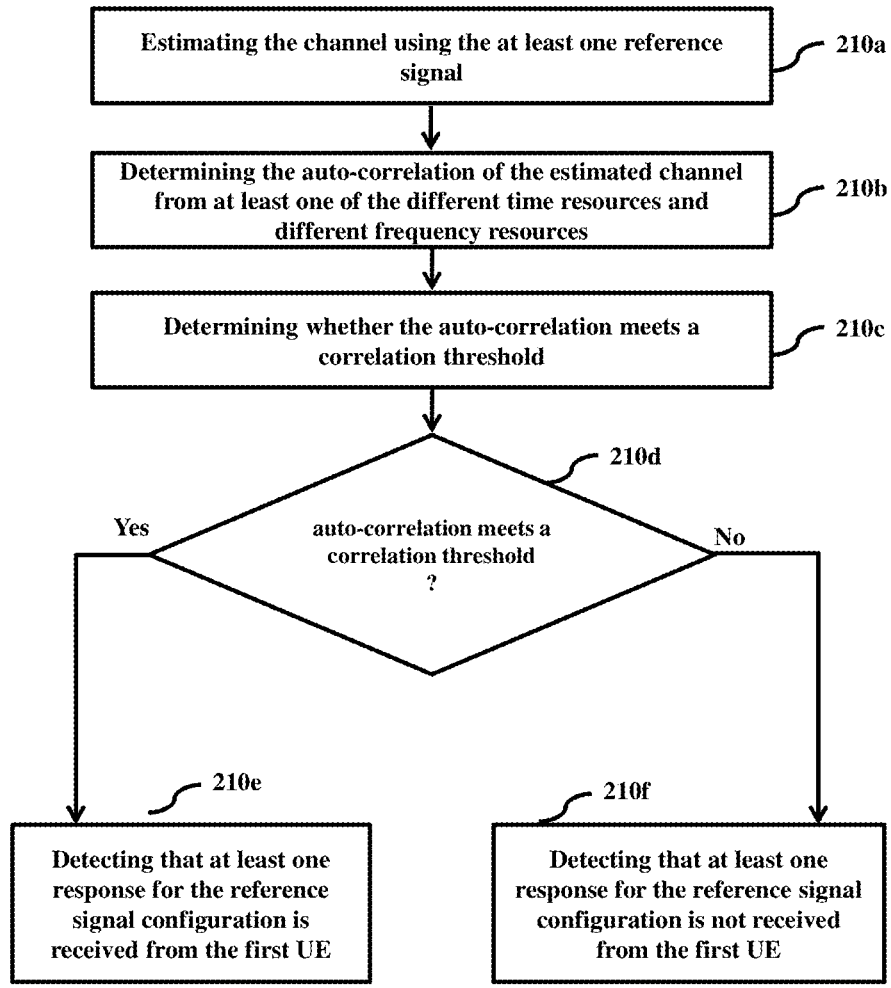

Referring to the FIG. 2f: at 210a, the method includes estimating the channel using the at least one reference signal. At 210b, the method includes determining the auto-correlation of the estimated channel from at least one of the different time resources and different frequency resources. At 210c-210d, the method includes determining whether the auto-correlation meets a correlation threshold. At 210e, the method includes detecting no beam failure event in response to determining that the auto-correlation does meet the correlation threshold. At 210f, the method includes detecting that at least one response for the reference signal configuration is not received from the first UE (300a) in response to determining that the auto-correlation does not meet the correlation threshold.

Figure 3A:
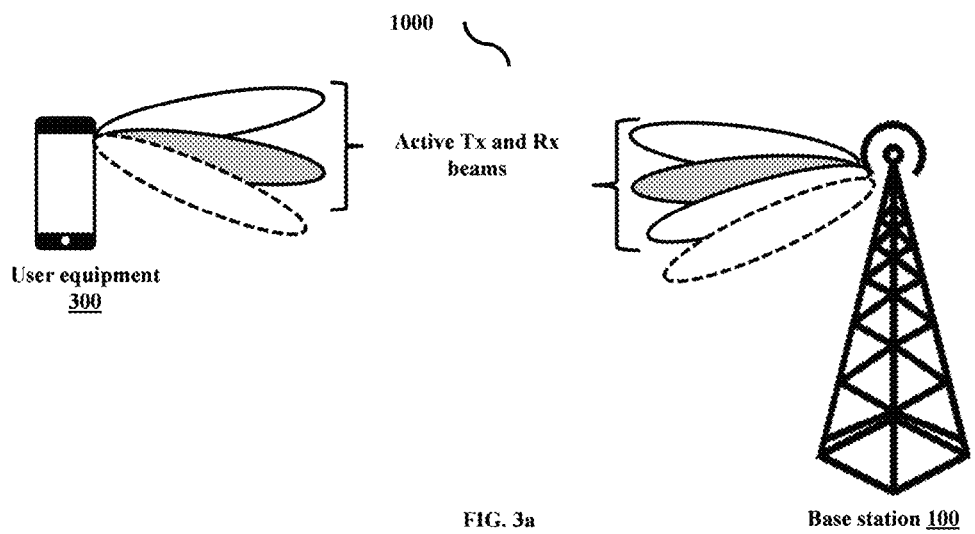
FIG. 3a illustrates a communication system including the BS, a User Equipment (UE) and multiple active transmit and receive beams, according to embodiments as disclosed herein.

FIG. 3a illustrates a communication system including the BS (100), the UE (300) and multiple active transmit and receive beams, according to embodiments as disclosed herein. The method for detecting beam failure event is already explained in FIG. 2a-2c and FIG. 2f.

Figure 3B:
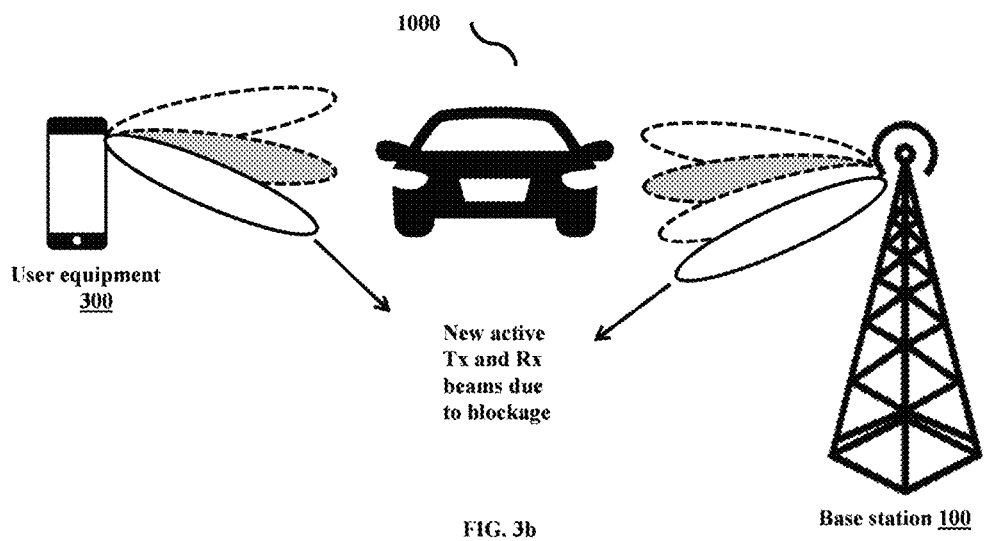
FIG. 3b shows a beam failure recovery process when there is a failure of active beams due to some blockage, according to embodiments as disclosed herein.

FIG. 3b shows the beam failure recovery process when there is a failure of active beams due to some blockage, according to embodiments as disclosed herein. The beam recovery procedure is already explained in FIG. 2d-2e.

Figure 4:
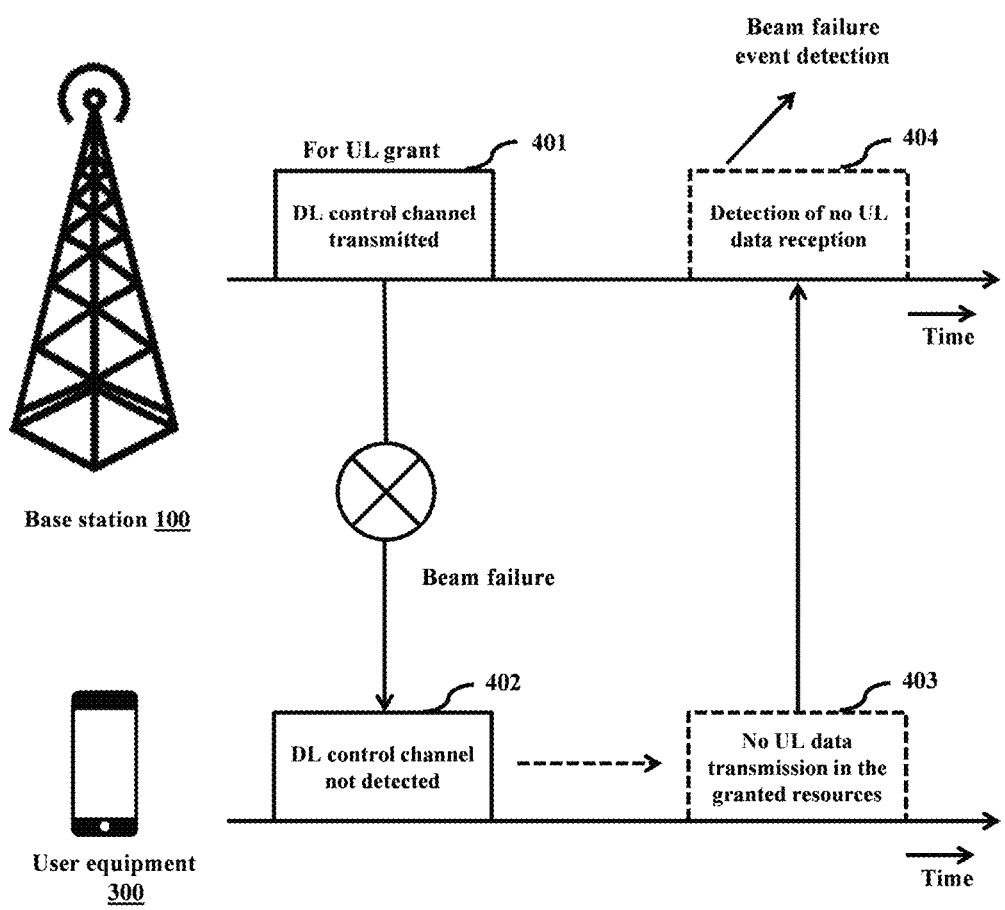
FIG. 4 shows a timing diagram of the BS and UE, where the BS detects a beam failure event based on the absence of data transmission from the UE, according to embodiments as disclosed herein.

FIG. 4 shows a timing diagram of the BS (100) and UE (300), where the BS (100) detects the beam failure event based on the absence of data transmission from the UE (300), according to embodiments as disclosed herein.

At 401, the BS (100) grants some time-frequency resource in UL, conveys using the downlink control channel for the UE to transmit its data. At 402, if UE (300) doesn't detect the control channel due to the beam failure event, it cannot transmit anything on the allocated time-frequency resources. At 403-404, therefore, the BS (100) identifies the beam failure event due to the absence of data transmission from the UE (300).

Figure 5:
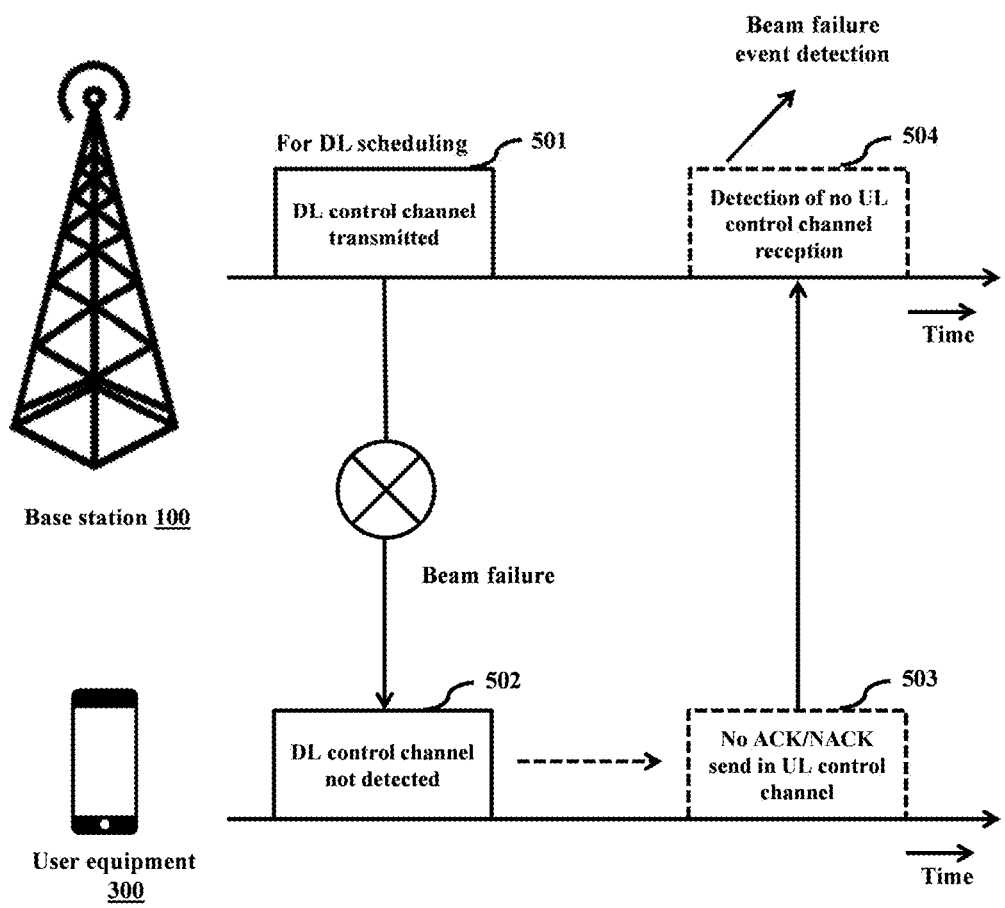
FIG. 5 shows another timing diagram of the BS and UE, where the BS detects a beam failure based on the absence of control channel transmission from the UE, according to embodiments as disclosed herein.

FIG. 5 shows another timing diagram of the BS (100) and UE (300), where the BS (100) detects the beam failure based on the absence of control channel transmission from the UE (300), according to embodiments as disclosed herein.

At 501, the BS (100) schedules some time-frequency resource, conveys using a downlink control channel for the UE (300) to receive its data. At 502-503, if the UE (300) doesn't detect the control channel due to the beam failure event, it cannot receive anything on the allocated time-frequency resources, and it cannot transmit any feedback on the uplink control channel. At 504, therefore, the BS (100) identifies the beam failure event due to the absence of control channel transmission from the UE (300).

Figure 6:
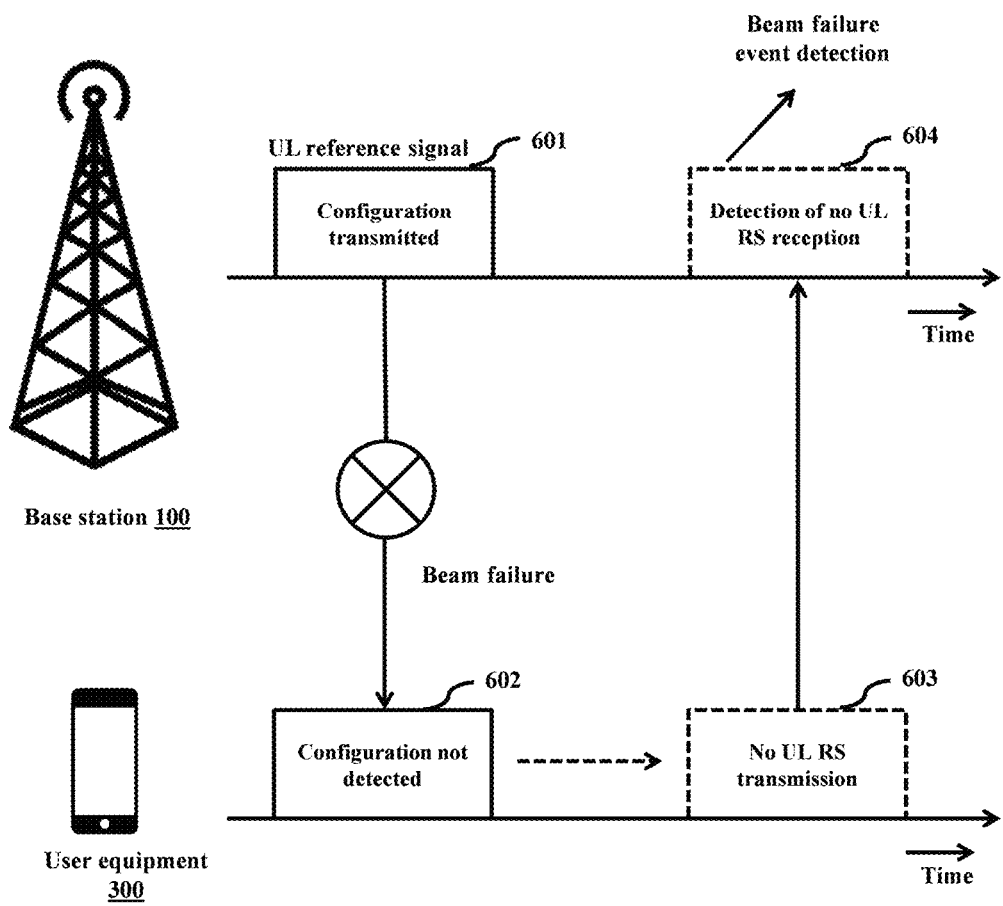
FIG. 6 shows another timing diagram of the BS and UE, where the BS detects a beam failure based on the absence of reference signal transmission from the UE, according to embodiments as disclosed herein.

FIG. 6 shows another timing diagram of the BS (100) and UE (300), where the BS (100) detects the beam failure based on the absence of reference signal transmission from the UE (100), according to embodiments as disclosed herein.

At 601, the BS (100) configures some time-frequency resource, conveys using a downlink channel for the UE (300) to transmit its reference signal. At 602-603, if the UE (300) doesn't detect the channel due to a beam failure event, it cannot transmit any reference signal on the allocated time-frequency resources. At 604, therefore, the BS (100) identifies the beam failure event due to the absence of reference signal transmission from the UE (300).

FIG. 7a-7e is a flow diagram (700) illustrating a method for detecting a beam failure event by the BS (100) in the wireless network (1000) based on receiving at least one measurement report, according to an embodiment as disclosed herein. The operations (702-726) are performed by the BS (100).

Figure 7A:
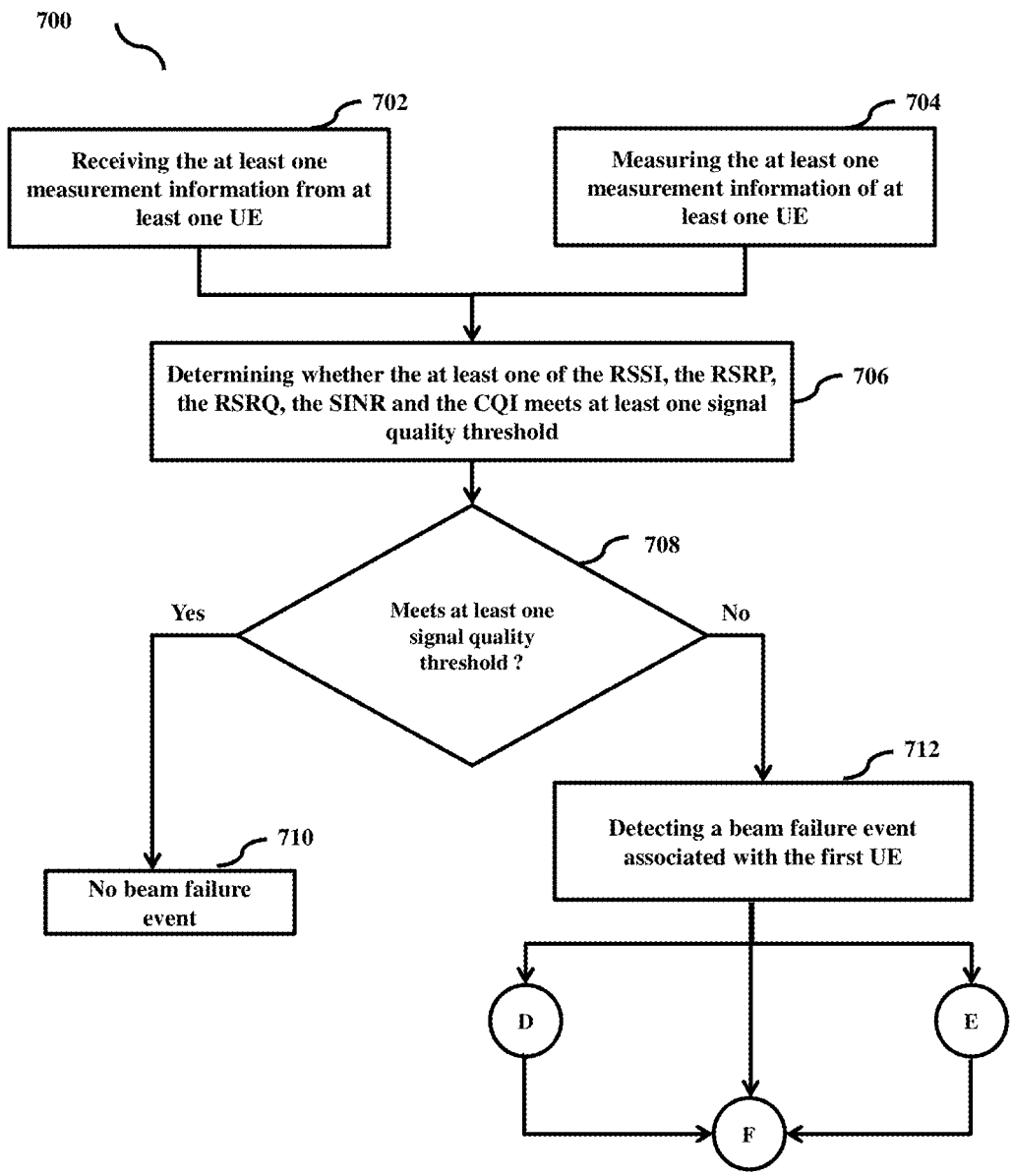
FIG. 7a-7e is a flow diagram illustrating a method for detecting a beam failure event by the BS in the wireless network based on receiving at least one measurement report, according to an embodiment as disclosed herein.

Referring to the FIG. 7a: at 702, the method includes receiving the at least one measurement information from at least one UE (300). At 704, the method includes measuring the at least one measurement information of the at least one UE (300), where the measurement information comprises at least one of a received signal strength indicator (RSSI), a reference signal received power (RSRP), a reference signal received quality (RSRQ), a signal-to-interference-plus-noise ratio (SINR) and a channel quality indicator (CQI). At 706-708, the method includes determining whether the at least one of the RSSI, the RSRP, the RSRQ, the SINR and the CQI meets at least one signal quality threshold. At 710, the method includes detecting no beam failure event associated with the first UE (300a) in response to determining that the at least one of the RSSI, the RSRP, the RSRQ, the SINR, and the CQI does not meet the at least one signal quality threshold. At 712, the method includes detecting a beam failure event associated with the first UE in response to determining that the at least one of the RSSI, the RSRP, the RSRQ, the SINR, and the CQI meets the at least one signal quality threshold.

Figure 7B:
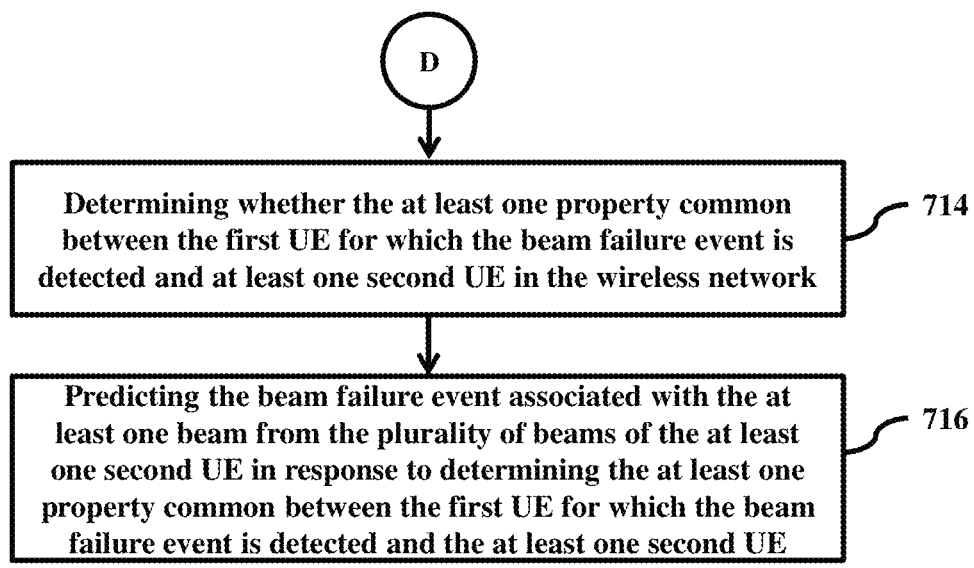

Referring to the FIG. 7b: at 714, the method includes determining whether the at least one property common between the first UE (300a) for which the beam failure event is detected and the at least one second UE (300b) in the wireless network (1000). At 716, the method includes predicting the beam failure event associated with the at least one beam from the plurality of beams of the at least one second UE (300b) in response to determining the at least one property common between the first UE (300a) for which the beam failure event is detected and the at least one second UE (300b).

Figure 7C:
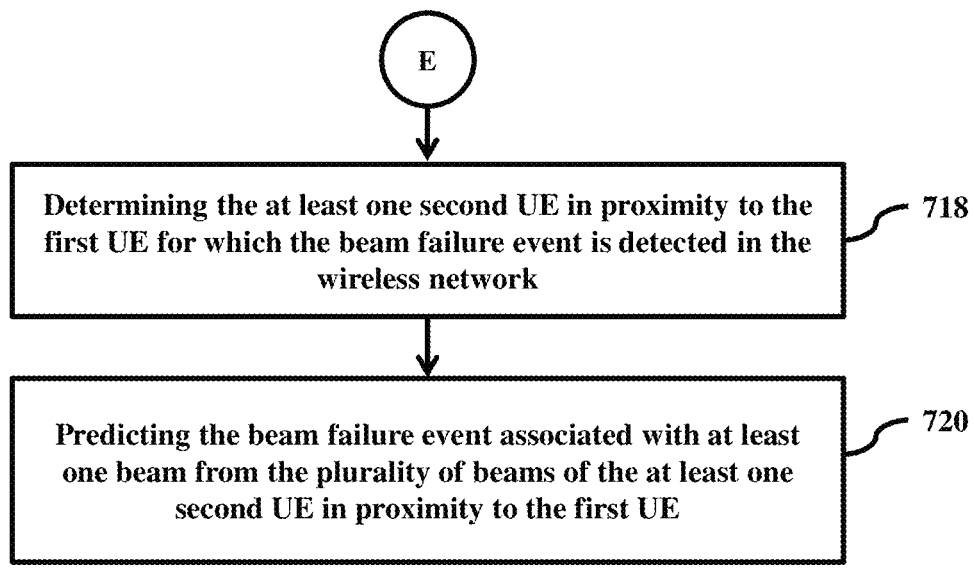

Referring to the FIG. 7c: at 718, the method includes determining the at least one second UE (300b) in proximity to the first UE (300a) for which the beam failure event is detected in the wireless network (1000). At 720, the method includes predicting the beam failure event associated with at least one beam from the plurality of beams of the at least one second UE (300b) in proximity to the first UE (300a).

Figure 7D:
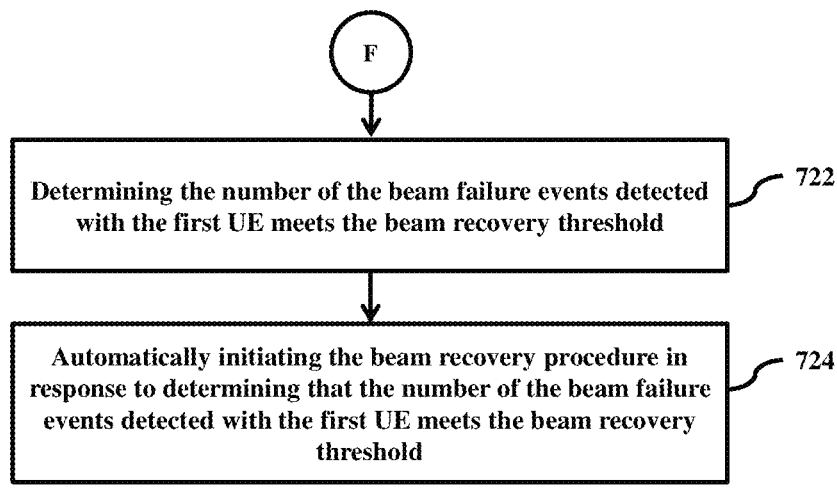

Referring to the FIG. 7d: at 722, the method includes determining the number of the beam failure events detected with the first UE (300a) meets the beam recovery threshold. At 724, the method includes automatically initiating the beam recovery procedure in response to determining that the number of the beam failure events detected with the first UE (300a) meets the beam recovery threshold.

Figure 7E:
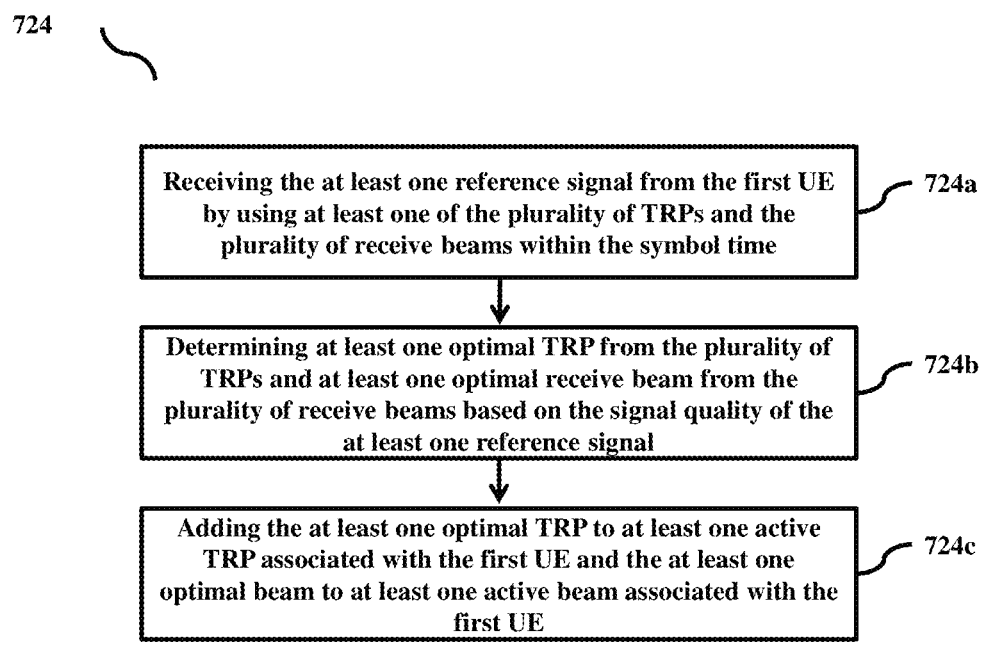

Referring to the FIG. 7e: at 724a, the method includes receiving the at least one reference signal from the first UE (300a) by using at least one of a plurality of TRPs and a plurality of receive beams within the symbol time. At 724b, the method includes determining at least one optimal TRP from the plurality of TRPs and at least one optimal receive beam from the plurality of beams based on the signal quality of the at least one reference signal. At 724c, the method includes adding the at least one optimal TRP to at least one active TRP associated with the first UE (300a) and the at least one optical beam to at least one active beam associated with the first UE (300a).

The embodiments disclosed herein can be implemented through at least one software program running on at least one hardware device and performing network management functions to control the elements.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

What is claimed is:

1. A method for detecting a beam failure event by a Base Station (BS) in a wireless network, comprising:
    transmitting, by the BS, at least one of a resource scheduling configuration and a reference signal configuration to at least one first User Equipment (UE) in the wireless network (1000);

determining, by the BS, whether at least one response is received from the first UE, wherein the at least one response comprises at least one of a Uplink (UL) data sent by the first UE based on the resource scheduling configuration, a feedback for Downlink (DL) data received from the first UE based on the resource scheduling configuration, and at least one reference signal transmission from the first UE based on the reference signal configuration; and detecting, by the BS, a beam failure event associated with at least one beam from the plurality of beams of the first UE in response to determining that the at least one response is not received from the first UE, wherein determining, by the BS, whether at least one response for the reference signal configuration is received from the first UE comprises:

estimating, by the BS, a channel using the at least one reference signal;

determining, by the BS, an auto-correlation of the estimated channel from at least one of the different time resources and different frequency resources;

determining, by the BS, whether the auto-correlation meets a correlation threshold; and detecting, by the BS, that the at least one response for the reference signal configuration is not received from the first UE in response to determining that the auto-correlation does not meet the correlation threshold.

2. The method as claimed in claim 1, wherein the resource scheduling configuration comprises at least one of scheduling information of at least one resource in an Uplink (UL) for the first UE to transmit data to the BS and scheduling information of at least one resource in a Downlink (DL) for the first UE to receive data from the BS.

3. The method as claimed in claim 1, wherein the reference signal configuration comprises information of at least one resource in the UL for first UE to transmit at least one reference signal to the BS.

4. The method as claimed in claim 1, further comprising:
determining, by the BS, whether at least one property common between the first UE for which the beam failure event is detected and at least one second UE in the wireless network; and predicting, by the BS, a beam failure event associated with at least one beam from a plurality of beams of the at least one second UE in response to determining the at least one property common between the first UE for which the beam failure event is detected and the at least one second UE.

5. The method as claimed in claim 4, wherein the at least one property common comprises at least one of a number of common beam sets, an Angle of Arrival (AoA) meeting a AoA tolerance, a Timing Advancement (TA) value meeting a TA tolerance, a pattern of measurements, and a pattern of beam failure events.

6. The method as claimed in claim 1, further comprising:
determining, by the BS, at least one second UE in proximity to the first UE for which the beam failure event is detected in the wireless network; and predicting, by the BS, a beam failure event associated with at least one beam from a plurality of beams of the at least one second UE in proximity to the first UE.

7. The method as claimed in claim 1, further comprising:
determining, by the BS, a number of the beam failure events detected with the first UE meets a beam recovery threshold; and automatically initiating, by the BS, a beam recovery procedure in response to determining that the number of the beam failure events detected with the first UE meets the beam recovery threshold.

8. The method as claimed in claim 7, wherein the beam recovery procedure comprises:
receiving, by the BS, at least one reference signal from the first UE by using at least one of a plurality of transmission-reception points (TRP) and a plurality of receive beams within a symbol time;

determining, by the BS, at least one optimal TRP from the plurality of TRPs and at least one optimal receive beam from the plurality of receive beams based on a signal quality of the at least one reference signal; and adding, by the BS, the at least one optimal TRP to at least one active TRP associated with the first UE and the at least one optimal beam to at least one active beam associated with the first UE.

9. The method as claimed in claim 8, wherein the at least one optimal beam is added to the at least one active receive beam in UL for the BS to receive a signal from the first UE, and the at least one optimal beam is added to the at least one active transmit beam in DL for the BS to transmit a signal to the first UE.

10. A method for detecting a beam failure event by a Base Station (BS), comprising:
receiving, by the BS, at least one measurement information from at least one User Equipment (UE) or measuring, by the BS, at least one measurement information of the at least one UE, wherein the measurement information comprises at least one of a received signal strength indicator (RSSI), a reference signal received power (RSRP), a reference signal received quality (RSRQ), a signal-to-interference-plus-noise ratio (SINR) and a channel quality indicator (CQI);

determining, by the BS, whether the at least one of the RSSI, the RSRP, the RSRQ, the SINR, and the CQI meets at least one signal quality threshold;

detecting, by the BS, a beam failure event associated with the first UE in response to determining that the at least one of the RSSI, the RSRP, the RSRQ, the SINR, and the CQI does not meet the at least one signal quality threshold;

determining, by the BS, whether at least one property common between the first UE for which the beam failure event is detected and at least one second UE in the wireless network; and predicting, by the BS, a beam failure event associated with at least one beam from a plurality of beams of the at least one second UE in response to determining the at least one property common between the first UE for which the beam failure event is detected and the at least one second UE.

11. The method as claimed in claim 10, wherein the at least one common property comprises at least one of a number of common beam sets, an Angle of Arrival (AoA) meeting a AoA tolerance, a Timing Advancement (TA) value meeting a TA tolerance, a pattern of measurements, and a pattern of beam failure events.

12. The method as claimed in claim 10, further comprising:
determining, by the BS, at least one second UE in proximity to the first UE for which the beam failure event is detected in the wireless network; and predicting, by the BS, a beam failure event associated with at least one beam from a plurality of beams of the at least one second UE in proximity to the first UE.

13. The method as claimed in claim 10, further comprising:

determining, by the BS, a number of the beam failure events detected with the first UE meets a beam recovery threshold; and
automatically initiating, by the BS, a beam recovery procedure in response to determining that the number of the beam failure events detected with the first UE meets the beam recovery threshold.

14. The method as claimed in claim 13, wherein the beam recovery procedure comprises:
receiving, by the BS, at least one reference signal from the first UE by using at least one of a plurality of transmission-reception points (TRP) and a plurality of receive beams within a symbol time;
determining, by the BS, at least one optimal TRP from the plurality of TRPs and at least one optimal receive beam from the plurality of beams based on a signal quality of the at least one reference signal; and
adding, by the BS, the at least one optimal TRP to at least one active TRP associated with the first UE and the at least one optical beam to at least one active beam associated with the first UE.

15. The method as claimed in claim 14, wherein the at least one optimal beam is added to the at least one active receive beam in UL for the BS to receive a signal from the first UE, and the at least one optimal beam is added to the at least one active transmit beam in DL for the BS to transmit a signal to the first UE.

16. A Base Station (BS) for detecting a beam failure event associated with at least one UE in a wireless network, wherein the BS comprises:
a memory;
a processor; and
a beam failure detection unit coupled to the memory and the processor, wherein the beam failure detection unit is configured for:
transmitting at least one of a resource scheduling configuration and a reference signal configuration to at least one first User Equipment (UE) in the wireless network,
determining whether at least one response is received from the first UE wherein the at least one response comprises at least one of a Uplink (UL) data sent by the first UE based on the resource scheduling configuration, a feedback for Downlink (DL) data received from the first UE based on the resource scheduling configuration, and at least one reference signal transmission from the first UE based on the reference signal configuration, and
detecting a beam failure event associated with at least one beam from the plurality of beams of the first UE in response to determining that the at least one response is not received from the first UE,
wherein determining whether at least one response for the reference signal configuration is received from the first UE comprises:
estimating a channel using the at least one reference signal;
determining an auto-correlation of the estimated channel from at least one of the different time resources and different frequency resources;
determining whether the auto-correlation meets a correlation threshold; and
detecting that the at least one response for the reference signal configuration is not received from the first UE in response to determining that the auto-correlation does not meet the correlation threshold.

17. The BS as claimed in claim 16, wherein the resource scheduling configuration comprises at least one of scheduling information of at least one resource in the UL for the first UE to transmit data to the BS, and scheduling information of at least one resource in the DL for the first UE to receive data from the BS.

18. The BS as claimed in claim 16, wherein the reference signal configuration comprises information of at least one resource in the UL for first UE to transmit at least one reference signal to the BS.

19. The BS as claimed in claim 16, wherein the beam failure detection unit configured for:
determining whether at least one property common between the first UE for which the beam failure event is detected and at least one second UE in the wireless network; and
predicting a beam failure event associated with at least one beam from a plurality of beams of the at least one second UE in response to determining the at least one property common between the first UE for which the beam failure event is detected and the at least one second UE.

20. The BS as claimed in claim 19, wherein the at least one common property comprises at least one of a number of common beam sets, an Angle of Arrival (AoA) meeting a AoA tolerance, a Timing Advancement (TA) value meeting a TA tolerance, a pattern of measurements and a pattern of beam failure events.

21. The BS as claimed in claim 16, wherein the beam failure detection unit configured for:
determining at least one second UE in proximity to the first UE for which the beam failure event is detected in the wireless network; and
predicting a beam failure event associated with at least one beam of a plurality from beams of the at least one second UE in proximity to the first UE.

22. The BS as claimed in claim 16, comprising a beam recovery unit configured for:
determining a number of the beam failure events detected with the first UE meets a beam recovery threshold; and
automatically initiating a beam recovery procedure in response to determining that the number of the beam failure events detected with the first UE meets the beam recovery threshold.

23. The BS as claimed in claim 22, wherein the beam recovery procedure comprises:
receiving at least one reference signal from the first UE by using at least one of a plurality of transmission-reception points (TRP) and a plurality of receive beams within a symbol time;
determining at least one optimal TRP from the plurality of TRPs and at least one optimal receive beam from the plurality of receive beams based on a signal quality of the at least one reference signal; and
adding the at least one optimal TRP to at least one active TRP associated with the first UE and the at least one optimal beam to at least one active beam associated with the first UE.

24. The BS as claimed in claim 23, wherein the at least one optimal beam is added to the at least one active receive beam in UL for the BS to receive a signal from the first UE, and the at least one optimal beam is added to the at least one active transmit beam in DL for the BS to transmit a signal to the first UE.

25. A Base Station (BS) for detecting a beam failure event, wherein the BS comprising:

a memory;

a processor; and a beam failure detection unit, coupled to the memory and the processor, wherein the beam failure detection unit is configured for:

receiving at least one measurement information from at least one User Equipment (UE) or measuring at least one measurement information of the at least one UE, wherein the measurement information comprises at least one of a received signal strength indicator (RSSI), a reference signal received power (RSRP), a reference signal received quality (RSRQ), a signal-to-interference-plus-noise ratio (SINR) and a channel quality indicator (CQI), determining whether the at least one of the RSSI, the RSRP, the RSRQ, the SINR, and the CQI meets at least one signal quality threshold, detecting a beam failure event associated with the first UE in response to determining that the at least one of the RSSI, the RSRP, the RSRQ, the SINR, and the CQI does not meet the at least one signal quality threshold;

determining whether at least one property common between the first UE for which the beam failure event is detected and at least one second UE in the wireless network; and predicting a beam failure event associated with at least one beam of a plurality from beams of the at least one second UE in response to determining the at least one property common between the first UE for which the beam failure event is detected and the at least one second UE.

26. The BS as claimed in claim 25, wherein the at least one common property comprises at least one of a number of common beam sets, an Angle of Arrival (AoA) meeting a AoA tolerance, a Timing Advancement (TA) value meeting a TA tolerance, a pattern of measurements, and a pattern of beam failure events.

27. The BS as claimed in claim 25, wherein the beam failure detection unit configured for:

determining at least one second UE in proximity to the first UE for which the beam failure event is detected in the wireless network; and predicting a beam failure event associated with at least one beam of a plurality from beams of the at least one second UE in proximity to the first UE.

28. The BS as claimed in claim 25, comprising a beam recovery unit configured for:

determining a number of the beam failure events detected with the first UE meets a beam recovery threshold; and automatically initiating a beam recovery procedure in response to determining that the number of the beam failure events detected with the first UE meets the beam recovery threshold.

29. The BS as claimed in claim 28, wherein the beam recovery procedure comprises:

receiving at least one reference signal from the first UE by using at least one of a plurality of transmission-reception points (TRP) and a plurality of receive beams within a symbol time;

determining at least one optimal TRP from the plurality of TRPs and at least one optimal receive beam from the plurality of receive beams based on a signal quality of the at least one reference signal; and adding the at least one optimal TRP to at least one active TRP associated with the first UE and the at least one optical beam to at least one active beam associated with the first UE.

30. The BS as claimed in claim 29, wherein the at least one optimal beam is added to the at least one active receive beam in UL for the BS to receive a signal from the first UE, and the at least one optimal beam is added to the at least one active transmit beam in DL for the BS to transmit a signal to the first UE.

* * * * *